`United States Patent` [19]

Maeno et al.

[11] Patent Number: 4,971,726

[45] Date of Patent: Nov. 20, 1990

[54] ELECTROCONDUCTIVE RESIN COMPOSITION

[75] Inventors: Seiji Maeno, Tokyo; Hidetaka Ozaki, Yachiyo; Yasuo Takamizu, Tokyo, all of Japan

[73] Assignee: Lion Corporation, Tokyo, Japan

[21] Appl. No.: 213,264

[22] Filed: Jun. 29, 1988

[30] Foreign Application Priority Data

Jul. 2, 1987 [JP] Japan ................................ 62-165749

[51] Int. Cl.$^5$ ............................................. H01B 1/06
[52] U.S. Cl. ..................................... 252/511; 524/495; 524/496; 523/137
[58] Field of Search ................. 252/511; 524/495, 496; 523/137

[56] References Cited

U.S. PATENT DOCUMENTS 4,704,231 11/1987 Chung .................................. 252/511

FOREIGN PATENT DOCUMENTS 0109824 5/1984 European Pat. Off. .
0129193 12/1984 European Pat. Off. .
51-17937 2/1976 Japan .
60-8335 1/1985 Japan .
60-118744 6/1985 Japan .
61-218648 9/1986 Japan .

*Primary Examiner*—Josephine Barr
*Attorney, Agent, or Firm*—Birch, Stewart, Kolasch & Birch

[57] ABSTRACT

An electroconductive resin composition comprising (i) 100 parts by weight of thermoplastic resins and/or thermosetting resins and (ii) 15 to 150 parts by weight of (a) carbon black having a DPB oil absorption amount of 400 ml/100 g or more and (b) expanded graphite having an average particle size of 40 $\mu$m or more, wherein the expanded graphite content is 40 to 90% by weight of the total amount of the carbon black and the expanded graphite.

8 Claims, No Drawings

ELECTROCONDUCTIVE RESIN COMPOSITION

BACKGROUND OF THE INVENTION

1. Field of the Invention

The present invention relates to an electroconductive resin composition exhibiting a high and stable electroconductivity which contains a small filling amount of a specific carbon black and graphite combination as the electroconductive filler which is used to fill a thermoplastic resin and/or a thermosetting resin.

2. Description of the Related Art

Remarkable developments have and are occurring in the field of electronic machines such as computers, VTR, acoustic instruments, home appliances, word processors, etc. In these electronic instruments, due to the high integration density of electronic circuits and devices thereof, microcurrents are used, and thus a problem arises in that an erroneous actuation, etc., may be caused by electromagnetic waves from an external source.

Plastic moldings are frequently used as casings of these electronic instruments to cope with the demands for a lightweight, low cost, mass-produced article, etc., but these plastic moldings do not have a shielding effect against electromagnetic waves, and thus cannot solve the above problem.

In the prior art, as a method for imparting an electromagnetic wave shielding property to plastic moldings, an electroconductive resin has been proposed comprising an electroconductive filler which is filled and dispersed in a resin. As the electroconductive filler, a metal type filler and a carbon type filler are generally employed.

A metal type filler is suitable for imparting a high electroconductivity, but has drawbacks in that the specific gravity thereof is high, the electroconductivity is reduced the losses occurring due to filler cutting during molding, and the metal type filler causes abrasion of the extrusion screws and molds.

A carbon type filler such as carbon black or graphite will not substantially abrade extrusion screws or molds, but it is not suitable for uses in which a high electroconductivity with a volume resistivity value of 1 $\Omega$·cm or less is required, such as electromagnetic shielding materials, electrodes, etc. Among electroconductive carbon blacks, a small amount of Ketjen Black EC (produced by Ketjen Black International) can provide a satisfactory electroconductivity, but the mechanical strength of the composition is remarkably worsened and the resultant material is very brittle and easily destroyed. Graphite itself has a good electro-conductivity, but when dispersed in a resin, a high electroconductivity can not be obtained unless a large filling hereof is used, and further, a problem arises in that the resistance value has a great amplitude of $10^1$ to $10^{-1}$ $\Omega$·cm, and a stable electroconductivity cannot be obtained (Japanese Unexamined Patent Publication (Kokai) No. 60-118744). Further, when carbon black and graphite are used in combination, although a high electroconductivity can be obtained from a low filling amount, the mechanical strength of the composition is lowered and the moldability reduced. Therefore, when a highly electroconductive resin composition is obtained by using the carbon black and graphite of the prior art, molding becomes difficult and the resin composition obtained has a lowered mechanical strength, particularly a lowered impact strength, and since carbon black and graphite are more expensive and have a higher specific gravity than the resin, a composition obtained by using these fillers is disadvantageous both in terms of having a high cost and in that it is heavy. To improve the moldability, a method has been proposed in which a propylene-ethylene copolymer with a high binder efficiency is formulated (Japanese Unexamined Patent Publication (Kokai) No. 51-17937), and a method in which a resin-coated carbon black and a resin-coated graphite are employed (Japanese Unexamined Patent Publication (Kokai) No. 61-218648), etc. However, these methods do not provide a reduction of the filling amount of carbon black and graphite, and thus did not provide a solution to the above problems. Accordingly, it is desirable that a carbon black and graphite which is capable of exhibiting a high electroconductivity even at a low filling amount, be produced.

SUMMARY OF THE INVENTION

Accordingly, the objects of the present invention are to eliminate the above-mentioned disadvantages of the prior art and to provide an electroconductive resin composition having a stable and high electroconductivity when a small filling amount of an electroconductive filler is formulated therein, and which has an excellent mechanical strength, kneadability, and moldability properties.

Other objects and advantages of the present invention will be apparent from the following description.

In accordance with the present invention, there is provided an electroconductive resin composition comprising (i) 100 parts by weight of at least one resin selected from the group consisting of thermoplastic resins and thermosetting resins and (ii) 15 to 150 parts by weight of (a) carbon black having a DBP oil absorption amount of 400 ml/100 g or more and (b) expanded graphite having an average particle size of 40 $\mu$m or more, wherein the expanded graphite content is 40 to 90% by weight of the total amount of the carbon black and the expanded graphite.

DESCRIPTION OF THE PREFERRED EMBODIMENTS

The present inventors previously proposed a composition having a high electroconductivity even at a filling amount of about 80%, compared with a carbon black of the prior art, for example, Ketjen Black EC (DBP oil absorption amount: 325 ml/100 g) by using a specific carbon black with a DBP oil absorption amount of 400 ml/100 g or more (Japanese Unexamined Patent Publication (Kokai) No. 60-8335). As a result of further investigations, to accomplish the present invention, a special graphite was used in combination with the special carbon black, to obtain an electroconductive resin composition having a high electroconductivity at a filling amount of about 60%, compared with the carbon black and graphite of the prior art, and consequently, having a lower cost and an improved specific gravity, and having excellent kneadability and mechanical strength properties.

The carbon black usable in the present invention has a DBP oil absorption amount of 400 ml/100 g or more. When the oil absorption amount is less, a larger amount of carbon black must be formulated to obtain a resin composition with a high electroconductivity, and thus the mechanical strength is impaired.

On the other hand, although the upper limit value of the DBP oil absorption amount is not particularly limited, when this amount is more than 700 ml/100 g, the dispersibility of carbon black in the resin is reduced, and therefore, preferably the DBP oil absorption amount is in the range of 400 to 600 ml/100 g. The term "DBP oil absorption amount" used in the present specification means the oil absorption amount defined according to ASTM D2414-79.

The expanded graphite usable in the present invention can be prepared by treating natural or artificial graphite with, for example, an inorganic acid such as sulfuric acid, nitric acid, etc., to form graphite interlayer compounds, washing the compounds with water followed by dehydration, abruptly heating and expanding the compounds, and compressing the resultant expanded graphite into a sheet or mass followed by mechanical pulverization thereof, by means of a Henschel mixer, hammer mill, ball mill, etc., to a particle size of 40 $\mu$m or more.

The upper limit value of the particle size of the expanded graphite is not particularly limited, but if the size is 5 cm or larger, kneading becomes undesirably difficult, and therefore, in the present invention, the range of the particle size is preferably from 40 to 20,000 $\mu$m.

The amounts of carbon black and expanded graphite used with the present invention are 15 to 150 parts by weight, preferably 20 to 130 parts by weight, based on 100 parts by weight of the thermoplastic and/or thermosetting region. At an amount lower, a high conductivity of $1 \times 10^\circ$ $\Omega$·cm or lower can not be exhibited, and at an amount higher, kneading becomes impossible.

The ratio of the carbon black to the graphite to be used in the represent invention may be 40 to 90% by wight, preferably 45 to 85% by weight, for the graphite based on 100% by weight of the total amount of the carbon black, and the graphite. When the graphite content excess 90% by weight, the electroconductivity is lowered, and at a content lower than 40% by weight, although the electroconductivity is good, the mechanical strength is lowered, and thus the object of the present invention tends to be difficult to be achieved.

The thermoplastic resins and thermosetting regions usable in the present invention include various types known in the art and are not particularly limited. Specific examples may include thermoplastic resins such as low, medium and high density polyethylenes, linear low density polyethylene, polypropylene, ethylene-propylene copolymer, ethylene-vinyl acetate copolymer, ethylene-acrylic acid ester copolymer, acrylonitrile-butadiene-styrene ternary copolymer, polystyrene, acrylonitrile-styrene copolymer, nitrile rubber, butadiene rubber, styrene-butadiene rubber, ethylene-propylene-diene rubber, silicone rubber, thermoplastic polyurethane resin, polyamide resin, polyester resin, polycarbonate, polyvinyl chloride, polyacetal resin, polyphenylene sulfite, polyphenylene oxide, etc. Examples of the thermosetting resins may include thermosetting acrylic resins, phenol resins, unsaturated polyester resins, epoxy resins, urethane resins, alkyd resins, etc.

The electroconductive resin composition of the present invention may further contain additives such as antioxidants, heat-resistant stabilizers, lubricants, flame retardants, pigments, plasticizers, cross-linking agents, UV-ray absorbers, reinforcing agents, etc., which are conventionally used in thermoplastic resins.

The composition of the present invention can be prepared according to any known method, but preferably is molded into pellets by mixing and kneading uniformly in a conventional manner by a suitable blender such as a kneader, Banbury mixer, mixing rolls, pressure kneader, etc., and these pellets are molded into a desired product by press molding, extrusion molding, injection molding, sheeting, blow molding, etc.

According to the present invention, a resin composition with a stable and high electroconductivity can be obtained at a low filling amount of carbon black and graphite, and therefore, is highly electroconductive compared with the resin composition of the prior art, and has excellent mechanical strength and moldability properties with a lower specific gravity. Accordingly, the electroconductive resin composition of the present invention can be applied to various fields, and can be utilized not only in electromagnetic wave shielding materials, but also, for example, as an electroconductive material for high voltage cables, ignition cables, plane heat-generating members, plane switches, electrodes, etc., or for applications such as electronic instruments or IC package materials, as a material for molded video discs, and as a permanent antistatic material, etc.

EXAMPLES

The present invention will now be further illustrated by, but is by no means limited to, the following Examples. The electroconductivity in the Examples was evaluated in terms of the volume resistivity value according to the measuring method of SRIS 2301 of the Rubber Society of Japan, the electromagnetic shielding effect was measured by both a TR-4172 and a shielding box produced by Advantest K. K., and the shielding was evaluated at a shielding of 300 MHz in the electrical field. The mechanical strength of the composition was evaluated by the Izod impact strength value obtained by the method of JIS-K-7110, and the specific gravity of the composition was measured according to the method of JIS-K-7112.

EXAMPLE 1

A polypropylene resin (produced by Idemitsu Sekiyu Kagaku, trade name: J-465H), carbon black and/or the various graphites as shown in Table-1 were formulated in the respective predetermined amounts, kneaded by a Laboplastomill at a temperature of 200° C., and then press molded into a plate 15 cm square with a thickness of 2 mm. The volume resistivity value (hereinafter abbreviated as VR) and the shielding effect of the obtained molded product were measured, and the results thereof are as shown in Table 1, in relation to each electroconductive resin composition.

When graphite alone was used (see Experiments No. 14–16), even when filled in an amount of 60 parts by weight based on 100 parts by weight of the total amount of the resin and the graphite, the VR and shielding effect were poor, and the amplitude of the measured value was great. Also, even when the graphite of the present invention was used alone, only a VR and shielding effect substantially equal to that obtained when employing a graphite other than that of the present invention were exhibited. On the other hand, as understood from Table 1, when the carbon black and the graphite of the present invention were used in combination (see Experiments No. 1–8), the VR is about $5 \times 10^{-2}$ $\Omega$·cm and the shielding effect was good at about 70 dB and stable with little amplitude of the value, thus having a superior shielding effect by about 15 dB and an about 4-fold VR, compared with the use of a carbon black and graphite other than those of the present invention (see Experiments No. 9-13), even at the same filling amount.

VR, Izod impact strength and specific gravity of the molded plate obtained were measured, and the results are shown in Table 2 in relation to each electroconductive resin composition.

From Table 2 it can be seen that, by using the carbon

TABLE 1

| | Present Invention | | | | | | | |
|---|---|---|---|---|---|---|---|---|
| Experiment No. | 1 | 2 | 3 | 4 | 5 | 6 | 7 | 8 |
| Electroconductive resin composition (wt. parts) | | | | | | | | |
| Polypropylene resin | 57 | 57 | 57 | 57 | 57 | 57 | 57 | 57 |
| DBP oil absorption amount | | | | | | | | |
| 480 ml/100 g carbon black | 13 | 13 | 13 | 13 | 13 | 0 | 0 | 0 |
| 420 ml/100 g carbon black | 0 | 0 | 0 | 0 | 0 | 13 | 13 | 0 |
| 400 ml/100 g carbon black | 0 | 0 | 0 | 0 | 0 | 0 | 0 | 13 |
| 325 ml/100 g carbon black*[1] | 0 | 0 | 0 | 0 | 0 | 0 | 0 | 0 |
| Graphite powder (average particle size) | | | | | | | | |
| Expanded graphite (2.8 μm) | 0 | 0 | 0 | 0 | 0 | 0 | 0 | 0 |
| Expanded graphite (4.2 μm) | 0 | 0 | 0 | 0 | 0 | 0 | 0 | 0 |
| Expanded graphite (40 μm) | 30 | 0 | 0 | 0 | 0 | 0 | 0 | 0 |
| Expanded graphite (70 μm) | 0 | 30 | 0 | 0 | 0 | 30 | 0 | 0 |
| Expanded graphite (500 μm) | 0 | 0 | 30 | 0 | 0 | 0 | 0 | 0 |
| Expanded graphite (5 mm) | 0 | 0 | 0 | 30 | 0 | 0 | 30 | 30 |
| Expanded graphite (10 mm) | 0 | 0 | 0 | 0 | 30 | 0 | 0 | 0 |
| Vein graphite (40 μm) | 0 | 0 | 0 | 0 | 0 | 0 | 0 | 0 |
| Artificial graphite (80 μm) | 0 | 0 | 0 | 0 | 0 | 0 | 0 | 0 |
| Volume resistivity value (Ω·cm)*[2] | $6.3 \times 10^{-2}$ | $4.1 \times 10^{-2}$ | $3.8 \times 10^{-2}$ | $3.7 \times 10^{-2}$ | $3.8 \times 10^{-2}$ | $5.1 \times 10^{-2}$ | $4.7 \times 10^{-2}$ | $5.0 \times 10^{-2}$ |
| | $6.7 \times 10^{-2}$ | $4.3 \times 10^{-2}$ | $3.9 \times 10^{-2}$ | $3.9 \times 10^{-2}$ | $3.9 \times 10^{-2}$ | $5.2 \times 10^{-2}$ | $4.9 \times 10^{-2}$ | $5.1 \times 10^{-2}$ |
| Shielding effect in electrical field of 300 MHz (dB)*[2] | 67.2 | 70.1 | 70.3 | 70.4 | 71.2 | 69.9 | 70.2 | 68.8 |
| | 68.5 | 72.1 | 72.2 | 72.3 | 72.3 | 70.8 | 71.0 | 69.8 |

| | Comparative | | | | | | | |
|---|---|---|---|---|---|---|---|---|
| Experiment No. | 9 | 10 | 11 | 12 | 13 | 14 | 15 | 16 |
| Electroconductive resin composition (wt. parts) | | | | | | | | |
| Polypropylene resin | 57 | 57 | 57 | 57 | 57 | 40 | 40 | 40 |
| DBP oil absorption amount | | | | | | | | |
| 480 ml/100 g carbon black | 13 | 13 | 13 | 13 | 0 | 0 | 0 | 0 |
| 420 ml/100 g carbon black | 0 | 0 | 0 | 0 | 0 | 0 | 0 | 0 |
| 400 ml/100 g carbon black | 0 | 0 | 0 | 0 | 0 | 0 | 0 | 0 |
| 325 ml/100 g carbon black*[1] | 0 | 0 | 0 | 0 | 13 | 0 | 0 | 0 |
| Graphite powder (average particle size) | | | | | | | | |
| Expanded graphite (2.8 μm) | 30 | 0 | 0 | 0 | 0 | 0 | 0 | 0 |
| Expanded graphite (4.2 μm) | 0 | 30 | 0 | 0 | 0 | 0 | 0 | 0 |
| Expanded graphite (40 μm) | 0 | 0 | 0 | 0 | 30 | 60 | 0 | 0 |
| Expanded graphite (70 μm) | 0 | 0 | 0 | 0 | 0 | 0 | 60 | 0 |
| Expanded graphite (500 μm) | 0 | 0 | 0 | 0 | 0 | 0 | 0 | 0 |
| Expanded graphite (5 mm) | 0 | 0 | 0 | 0 | 0 | 0 | 0 | 0 |
| Expanded graphite (10 mm) | 0 | 0 | 0 | 0 | 0 | 0 | 0 | 0 |
| Vein graphite (40 μm) | 0 | 0 | 30 | 0 | 0 | 0 | 0 | 60 |
| Artificial graphite (80 μm) | 0 | 0 | 0 | 30 | 0 | 0 | 0 | 0 |
| Volume resistivity value (Ω·cm)*[2] | $1.8 \times 10^{-1}$ | $1.4 \times 10^{-1}$ | $1.8 \times 10^{-1}$ | $2.3 \times 10^{-1}$ | $1.0 \times 10^{-1}$ | $2.8 \times 10^{0}$ | $1.9 \times 10^{0}$ | $3.0 \times 10^{0}$ |
| | $2.0 \times 10^{-1}$ | $1.6 \times 10^{-1}$ | $2.5 \times 10^{-1}$ | $2.8 \times 10^{-1}$ | $1.2 \times 10^{-1}$ | $8.2 \times 10^{0}$ | $6.3 \times 10^{0}$ | $8.0 \times 10^{0}$ |
| Shielding effect in electrical field of 300 MHz (dB)*[2] | 51.3 | 53.2 | 49.1 | 46.2 | 56.0 | 6.2 | 9.5 | 6.3 |
| | 52.4 | 55.5 | 52.3 | 49.3 | 59.0 | 19.3 | 23.7 | 18.2 |

*[1]Carbon black with DBP oil absorption amount of 325 ml/100 g is Ketjen Black EC
*[2]Volume resistivity value and shielding effect at electrical field of 300 MHz was measured with 3 samples prepared with the same composition, and the upper limit value and the lower limit value measured are shown.

EXAMPLE 2

A polypropylene resin (produced by Idemitsu Sekiyu Kagaku, trade name: J-465H) was formulated with the carbon black and various types of graphite shown in Table 2 so that the molded plate exhibited a VR of about $1 \times 10^{-1}$ Ω·cm, and kneaded and molded according to the same method as described in Example 1. The black and graphite of the present invention, when a VR of about $1 \times 10^{-1}$ is exhibited, the filling amount may be about 60% by weight, compared with that when employing a carbon black and graphite other than that of the present invention, whereby the Izod impact strength can be improved and the specific gravity reduced.

TABLE 2

| | Present Invention | | | | Comparative | | |
|---|---|---|---|---|---|---|---|
| Experiment No. | 17 | 18 | 19 | 20 | 21 | 22 | 23 |
| Electroconductive resin composition (wt. parts) | | | | | | | |

TABLE 2-continued

| | Present Invention | | | | Comparative | | |
|---|---|---|---|---|---|---|---|
| Experiment No. | 17 | 18 | 19 | 20 | 21 | 22 | 23 |
| Polypropylene resin | 65 | 67 | 71 | 70 | 52.4 | 53.3 | 58.7 |
| Oil absorption amount 480 ml/100 g carbon black | 10.5 | 9.9 | 8.7 | 9.0 | 14.3 | 14.0 | 0 |
| Oil absorption amount 325 ml/100 g carbon black | 0 | 0 | 0 | 0 | 0 | 0 | 12.4 |
| Graphite powder (particle size) | | | | | | | |
| Expanded graphite (4.2 $\mu$m) | 0 | 0 | 0 | 0 | 33.3 | 0 | 0 |
| Expanded graphite (40 $\mu$m) | 24.5 | 0 | 0 | 0 | 0 | 0 | 28.9 |
| Expanded graphite (70 $\mu$m) | 0 | 23.1 | 0 | 0 | 0 | 0 | 0 |
| Expanded graphite (500 $\mu$m) | 0 | 0 | 20.3 | 0 | 0 | 0 | 0 |
| Expanded graphite (5 mm) | 0 | 0 | 0 | 21.0 | 0 | 0 | 0 |
| Scale graphite (40 $\mu$m) | 0 | 0 | 0 | 0 | 0 | 32.7 | 0 |
| Volume resistivity value ($\Omega \cdot$ cm) | $9.1 \times 10^{-2}$ | $9.7 \times 10^{-2}$ | $9.8 \times 10^{-2}$ | $9.9 \times 10^{-2}$ | $9.5 \times 10^{-2}$ | $9.7 \times 10^{-2}$ | $1.1 \times 10^{-1}$ |
| Izod impact strength (kg $\cdot$ cm/cm) | 3.0 | 3.3 | 4.2 | 4.2 | 0.2 | 0.1 | 1.1 |
| Specific gravity | 1.14 | 1.12 | 1.10 | 1.09 | 1.25 | 1.25 | 1.20 |
| Total amount of carbon black and graphite based on 100 parts by weight of polypropylene | 53.8 | 49.3 | 40.8 | 42.9 | 90.8 | 87.6 | 70.2 |

EXAMPLE 3

A 100 parts by weight amount of a high density polyethylene resin (produced by Idemitsu Sekiyu Kagaku, trade name: 520 (B) was formulated respectively with predetermined amounts of a carbon black with a DBP oil absorption amount of 480 ml/100 g and an expanded graphite with an average particle size of 500 $\mu$m, kneaded by a Laboplastomill at a temperature of 180° C., and press molded according to the same method as in Example 1. The VR, the shielding effect, and the Izod impact strength of the molded plate obtained were measured, and the results are shown in Table 3 in relation to each electroconductive resin composition.

TABLE 3

| | Present Invention | | | | Comparative | | | |
|---|---|---|---|---|---|---|---|---|
| Experiment No. | 24 | 25 | 26 | 27 | 28 | 29 | 30 | 31 |
| Electroconductive resin composition (wt. parts) | | | | | | | | |
| High density polyethylene resin | 100 | 100 | 100 | 100 | 100 | 100 | 100 | 100 |
| DBP oil absorption amount 480 ml/100 g carbon black (A) | 12.0 | 10.8 | 15 | 13 | 14.7 | 7.8 | 7.5 | 16 |
| Expanded graphite (average particle size 500 $\mu$m) (B) | 8.0 | 7.2 | 135 | 117 | 6.3 | 5.2 | 142.5 | 144 |
| Carbon black A/Expanded graphite (500 $\mu$m) B | 60/40 | 60/40 | 10/90 | 10/90 | 70/30 | 60/40 | 5/95 | 10/90 |
| Volume resistivity value ($\Omega \cdot$ cm) | $2.0 \times 10^{-1}$ | $9.0 \times 10^{-1}$ | $3.5 \times 10^{-2}$ | $4.2 \times 10^{-2}$ | $2.3 \times 10^{-1}$ | $8.0 \times 10^{0}$ | $6.3 \times 10^{0}$ | —* |
| Shielding effect in electrical field of 300 MHz (dB) | 50.6 | 31.1 | 72.2 | 71.4 | 49.9 | 5.9 | 9.5 | —* |
| Izod impact strength (kg $\cdot$ cm/cm) | 3.0 | 8.2 | 1.5 | 2.0 | 0.2 | 10.5 | 1.0 | —* |

*No sample preparation possible because kneading was impossible.

EXAMPLE 4

Different types of resins (70 parts by weight), 9 parts by weight of a carbon black with a DBP oil absorption amount of 480 ml/100 g and 21 parts by weight of an expanded graphite with an average particle size of 500 $\mu$m were kneaded and press molded at a temperature shown in Table 4, to obtain a plate 15 cm square having a thickness of 2 mm. The VR and the shielding effect of the molded plate were measured, and the types of resins, kneading, and molding temperatures employed, and the measurement results, are shown in Table 4.

TABLE 4

| Experiment No | Resin (kind) | Kneading temperature (°C.) | Molding temperature (°C.) | Volume resistivity value ($\Omega \cdot$ cm) | Shielding effect in electrical field of 300 MHz (dB) |
|---|---|---|---|---|---|
| 32 | ABS (Mitsubishi Monsanto Kasei, trade name: Tuflex 710) | 200 | 220 | $2.3 \times 10^{-1}$ | 48.9 |
| 33 | Polystyrene (produced by Idemitsu Sekiyu Kagaku, trade name: SEHI 110) | 200 | 220 | $9.2 \times 10^{-2}$ | 60.0 |
| 34 | Polybutyleneterephthalate (Toray, trade name: PBT-1400L) | 230 | 260 | $2.2 \times 10^{-1}$ | 49.4 |
| 35 | Polyphenylene oxide (Produced by Engineering Plastic trade name: Noryl 731J-802) | 200 | 220 | $2.4 \times 10^{-1}$ | 48.4 |
| 36 | Nylon (Produced by Du Pont, trade | 250 | 270 | $2.0 \times 10^{1}$ | 50.1 |

TABLE 4-continued

| Experiment No | Resin (kind) | Kneading temperature (°C.) | Molding temperature (°C.) | Volume resistivity value ($\Omega \cdot cm$) | Shielding effect in electrical field of 300 MHz (dB) |
|---|---|---|---|---|---|
| 37 | name: Zaitel ST801) Low density polyethylene (Produced by Mitsubishi Yuka, trade name: Yukalon 2F-30) | 120 | 150 | $9.5 \times 10^{-2}$ | 59.6 |

EXAMPLE 5

A 70 parts by weight amount of a polypropylene resin (produced by Idemitsu Sekiyu Kagaku, trade name: J-465H), 9 parts by weight of a carbon black with a DBP oil absorption amount of 480 ml/100 g and 21 parts by weight of an expanded graphite with an average particle size of 500 μm were added with additives for resins such as antioxidants for resins, UV-ray absorbers, flame retardants, reinforcing agents, lubricants, etc., shown in Table 5, and kneaded and molded according to the same method as in Example 1. The VR and the shielding effect of the molded products obtained were measured, and the types and amounts of the additives for resins employed, and the measurement results, are shown in Table 5.

TABLE 5

| Experiment No. | 38 | 39 | 40 | 41 | 42 | 43 | 44 |
|---|---|---|---|---|---|---|---|
| Additives for resins | Amount added (wt. parts) | | | | | | |
| Pentaerythrityl-tetrakis 3-(3,5-di-tert-butyl-4-hydroxyphenyl)propiolate | 2.0 | 2.0 | 2.0 | 2.0 | 2.0 | 2.0 | 2.0 |
| Phenylsalicylate | 0.1 | 0 | 0 | 0.1 | 0 | 0.1 | 0 |
| 2-Hydroxy-4-n-octoxybenzophenone | 0.1 | 0.2 | 0 | 0 | 0 | 0 | 0 |
| Trichloroethyl phosphate | 0 | 0 | 0.1 | 0.1 | 0 | 0 | 0 |
| Antimony trioxide | 5.0 | 0 | 0 | 5.0 | 0 | 0 | 0 |
| Decabromodiphenyl oxide | 0 | 0 | 5.0 | 5.0 | 0 | 0 | 0 |
| Zinc stearate | 0.5 | 0.5 | 0 | 0 | 2.0 | 0 | 2.0 |
| Ethylene bisstearoamide | 0 | 0 | 0.5 | 0 | 0 | 0.5 | 0 |
| Glass fiber | 0 | 15 | 0 | 0 | 15 | 15 | 0 |
| Volume resistivity value ($\Omega \cdot cm$) | $9.9 \times 10^{-2}$ | $1.3 \times 10^{-1}$ | $9.9 \times 10^{-2}$ | $1.2 \times 10^{-1}$ | $1.3 \times 10^{-1}$ | $1.2 \times 10^{-1}$ | $9.6 \times 10^{-2}$ |
| Shielding effect in electrical field of 300 MHz (dB) | 59.1 | 55.7 | 59.2 | 56.8 | 55.8 | 56.8 | 59.5 |

EXAMPLE 6

A thermoplastic resin, carbon black having a DBP oil absorption amount of 480 ml/100 g, expanded graphite, antioxidants for resins, flame retardants, reinforcing agents, lubricants, and plasticizers listed in Tables 6 and 7 were formulated in an amount shown in Tables 6 and 7. The mixture was kneaded and molded in the same manner as in Example 1. The VR and the shielding effect of the molded products obtained were measured. The results are shown in Tables 6 and 7 in relation to the composition of the electroconductive resin.

TABLE 6

| Experiment No. | 45 | 46 | 47 | 48 | 49 | 50 | 51 | 52 |
|---|---|---|---|---|---|---|---|---|
| Composition of electroconductive resin (wt. parts) | | | | | | | | |
| Polypropylene resin A*1 | 72.5 | 0 | 0 | 0 | 0 | 0 | 0 | 0 |
| Polypropylene resin B*2 | 0 | 72.5 | 0 | 0 | 0 | 0 | 0 | 0 |
| Polypropylene resin C*3 | 0 | 0 | 48 | 0 | 0 | 0 | 0 | 48 |
| Polypropylene resin D*4 | 0 | 0 | 0 | 48 | 48 | 36 | 36 | 0 |
| Polypropylene resin E*5 | 0 | 0 | 0 | 0 | 0 | 12 | 12 | 0 |
| Ethylene-propylene rubber A*6 | 0 | 0 | 10 | 10 | 0 | 10 | 0 | 0 |
| Ethylene-propylene rubber B*7 | 0 | 0 | 0 | 0 | 10 | 0 | 10 | 10 |
| Carbon black having DBP oil absorption amount of 480 ml/100 g | 11 | 11 | 11 | 11 | 11 | 11 | 11 | 9 |
| Expanded graphite having particle size 5 mm | 16.5 | 16.5 | 16.5 | 16.5 | 16.5 | 16.5 | 16.5 | 21 |
| Talc | 0 | 0 | 14.5 | 14.5 | 14.5 | 0 | 0 | 0 |
| Glass fiber | 0 | 0 | 0 | 0 | 0 | 14.5 | 0 | 14.5 |
| Calcium carbonate | 0 | 0 | 0 | 0 | 0 | 0 | 14.5 | 0 |
| Antioxidant for resin A*8 | 1 | 1 | 0 | 0 | 0 | 0 | 0 | 0 |
| Antioxidant for resin B*9 | 0 | 0 | 1 | 1 | 1 | 1 | 1 | 1 |
| Ethylenebis hydrogenated tallow acid amide | 1 | 1 | 1 | 1 | 1 | 1 | 1 | 1 |
| Volume resistivity value ($\Omega \cdot cm$) | $1.1 \times 10^{-1}$ | $1.0 \times 10^{-1}$ | $1.2 \times 10^{-1}$ | $1.2 \times 10^{-1}$ | $1.0 \times 10^{-1}$ | $1.2 \times 10^{-1}$ | $1.2 \times 10^{-1}$ | $1.0 \times 10^{-1}$ |
| Shielding effect in electrical | 57.3 | 58.8 | 56.4 | 56.0 | 57.5 | 56.2 | 56.1 | 57.3 |

TABLE 6-continued

| Experiment No. | 45 | 46 | 47 | 48 | 49 | 50 | 51 | 52 |
|---|---|---|---|---|---|---|---|---|
| field of 300 MHz (dB) | | | | | | | | |

*[1] Karupu Kogyo K. K. 4200G
*[2] Karupu Kogyo K. K. 4560GF
*[3] Idemitsu Petrochemical Co. J-5050H
*[4] Idemitsu Petrochemical Co. J-465H
*[5] Idemitsu Petrochemical Co. J-3066H
*[6] Japan Synthetic Rubber Co. EP-07P
*[7] Japan Synthetic Rubber Co. EP-912P
*[8] Pentaerythtyl-tetrakis 3-(3,5-di-t-butyl-4-hydroxyphenyl)propiolate
*[9] Pentaerythtyl-tetrakis 3-(3,5-di-t-butyl-4-hydroxyphenyl)propionate/Tris(2,4-di-t-butylphenyl)phosphite = 50/50

TABLE 7

| Experiment No. | 53 | 54 | 55 | 56 | 57 | 58 | 59 | 60 | 61 | 62 |
|---|---|---|---|---|---|---|---|---|---|---|
| Composition of Electroconductive resin (wt. parts) | | | | | | | | | | |
| 6-Nylon resin A*[1] | 47 | 0 | 0 | 45 | 0 | 0 | 0 | 0 | 0 | 0 |
| 6-Nylon resin B*[2] | 0 | 47 | 30 | 0 | 0 | 0 | 0 | 0 | 0 | 0 |
| 6-Nylon resin C*[3] | 0 | 0 | 20 | 0 | 0 | 0 | 0 | 0 | 0 | 0 |
| High-density polyethylene resin*[4] | 0 | 0 | 0 | 0 | 64 | 48 | 0 | 0 | 0 | 0 |
| ABS resin*[5] | 0 | 0 | 0 | 0 | 0 | 0 | 75 | 72.5 | 0 | 0 |
| PBT resin*[6] | 0 | 0 | 0 | 0 | 0 | 0 | 0 | 0 | 47 | 50 |
| Carbon black having DBP oil absorption amount of 480 ml/100 g | 6.9 | 6.9 | 7.5 | 10 | 10.8 | 11 | 10 | 8.25 | 6.9 | 10 |
| Expanded graphite having average particle size of 5 mm | 16.1 | 16.1 | 17.5 | 15 | 25.2 | 16.5 | 15 | 19.25 | 16.1 | 15 |
| Butyl benzyl phthalate | 0 | 0 | 0 | 0 | 0 | 0 | 5 | 0 | 0 | 0 |
| Antioxidant for resin A*[7] | 0 | 0 | 0 | 1 | 0 | 0 | 0 | 0 | 1 | 1 |
| Antioxidant for resin B*[8] | 0 | 0 | 0 | 0 | 1 | 1 | 1 | 1 | 0 | 0 |
| Cuprous iodide | 1 | 1 | 1 | 0 | 0 | 0 | 0 | 0 | 0 | 0 |
| Ethylene-propylene rubber A*[9] | 0 | 0 | 0 | 0 | 0 | 10 | 0 | 0 | 0 | 0 |
| Ethylene-propylene rubber B*[10] | 0 | 0 | 0 | 5 | 0 | 0 | 0 | 0 | 0 | 10 |
| Antimony trioxide | 3.75 | 3.75 | 2.5 | 3.75 | 0 | 0 | 0 | 0 | 3.75 | 0 |
| Decabromo diphenyl ether | 11.25 | 11.25 | 7.5 | 11.25 | 0 | 0 | 0 | 0 | 11.25 | 0 |
| Glass fiber | 15 | 15 | 15 | 10 | 0 | 0 | 0 | 0 | 15 | 15 |
| Talc | 0 | 0 | 0 | 0 | 0 | 14.5 | 0 | 0 | 0 | 0 |
| Ethylenebis hydrogenated tallow acid amide | 1 | 1 | 1 | 0 | 1 | 1 | 1 | 1 | 1 | 1 |
| Benzene sulfonic acid butyl amide | 0 | 0 | 0 | 1 | 0 | 0 | 0 | 0 | 0 | 0 |
| Volume resistivity value ($\Omega \cdot$ cm) | $1.2 \times 10^{-1}$ | $1.2 \times 10^{-1}$ | $1.0 \times 10^{-1}$ | $1.0 \times 10^{-1}$ | $8.3 \times 10^{-2}$ | $1.3 \times 10^{-1}$ | $1.0 \times 10^{-1}$ | $1.0 \times 10^{-1}$ | $1.1 \times 10^{-1}$ | $1.3 \times 10^{-1}$ |
| Shielding effect in electrical field of 300 MHz (dB) | 56.0 | 56.5 | 58.3 | 58.1 | 61.3 | 54.0 | 57.3 | 57.5 | 57.1 | 54.3 |

*[1] Mitsubishi Chemical Co., 1007J (pellet)
*[2] Mitsubishi Chemical Co., 1007J (Crushed powder having a size of 100–200 μm)
*[3] Mitsubishi Chemical Co., ST-145
*[4] Idemitsu Petrochemical Co., 110J
*[5] Japan Synthetic Rubber Co., JSR ABS 35
*[6] Toray Co., PBT-1400L
*[7] N,N'-Hexamethylenebis(3,5-di-t-butyl-4-hydroxy-hydrocinnamide)/tris(2,4-di-t-butyl-phenyl)phosphite = 50/50
*[8] Pentaerythtyl-tetrakis 3-(3,5-di-t-butyl-4-hydroxyphenyl)propiolate
*[9] Japan Synthetic Rubber Co., EP-07P
*[10] Japan Synthetic Rubber Co., T7741P

We claim:

1. An electroconductive resin composition comprising (i) 100 parts by weight of at least one resin selected from the group consisting of thermoplastic resins and thermosetting resins and (ii) 15 to 150 parts by weight of (a) carbon black having a DPB oil absorption amount of 400 ml/100 g to 600 ml/100 g and (b) expanded graphite having an average particle size of 40 μm to 20000 μm, the expanded graphite content being 40 to 90% by weight of the total amount of the carbon black and the expanded graphite.

2. The electroconductive resin composition as claimed in claim 1, wherein the resin is a thermoplastic resin.

3. The electroconductive resin composition as claimed in claim 2, wherein the thermoplastic resin is at least one resin selected from the group consisting of a low, medium or high density polyathylene, linear low density polyethylene, polypropylene, ethylene-propylene copolymer, ethylene-vinyl acetate copolymer, ethylene-acrylic acid ester copolymer, acrylonitrile-butadiene-styrene ternary copolymer, polystyrene, acrylonitrile-styrene copolymer, nitrile rubber, butadiene rubber, styrene-butadiene rubber, ethylene-propylene-diene rubber, silicone rubber, thermoplastic polyurethane resin, polyamide resin, polyester resin, polycarbonate, polyvinyl chloride, polyacetal resin, polyphenylene sulfite, and polyphenylene oxide.

4. The electroconductive resin composition as claimed in claim 1, wherein the resin is a thermosetting resin.

5. The electroconductive resin composition as claimed in claim 4, wherein the thermosetting resin is at least one resin selected from the group consisting of thermosetting acrylic resins, phenol resins, unsaturated polyester resins, epoxy resins, urethane resins, and alkyd resins.

6. The electroconductive resin composition as claimed in claim 1, wherein the total amount of the carbon black and the expanded graphite is 20 to 130 parts by weight based on 100 parts by weight of the resin.

7. The electroconductive resin composition as claimed in claim 1, wherein the amount of the expanded graphite is 45% to 85% by weight of the total amount of the carbon black and the expanded graphite.

8. The electroconductive resin composition as claimed in claim 1, in which said composition is characterized with an electroconductivity of 1Ω·cm or lower.

* * * * *